United States Patent
Obasih et al.

(10) Patent No.: US 10,062,934 B2
(45) Date of Patent: Aug. 28, 2018

(54) COOLING SYSTEM AND METHOD FOR LITHIUM-ION BATTERY MODULE

(71) Applicant: Johnson Controls Technology Company, Holland, MI (US)

(72) Inventors: Kem M. Obasih, Brookfield, WI (US); Richard M. DeKeuster, Racine, WI (US); Gary P. Houchin-Miller, Milwaukee, WI (US); Stephen D. Cash, Cary, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 918 days.

(21) Appl. No.: 14/340,352

(22) Filed: Jul. 24, 2014

(65) Prior Publication Data

US 2015/0093613 A1 Apr. 2, 2015

Related U.S. Application Data

(60) Provisional application No. 61/858,364, filed on Jul. 25, 2013.

(51) Int. Cl.
*H01M 10/625* (2014.01)
*H01M 10/647* (2014.01)
(Continued)

(52) U.S. Cl.
CPC ....... *H01M 10/625* (2015.04); *H01M 10/647* (2015.04); *H01M 10/656* (2015.04);
(Continued)

(58) Field of Classification Search
CPC ............. H01M 10/625; H01M 10/656; H01M 10/647; H01M 10/6555; H01M 10/6562;
(Continued)

(56) References Cited

U.S. PATENT DOCUMENTS 5,866,276 A 2/1999 Ogami et al.
6,111,387 A * 8/2000 Kouzu ................ H01M 2/1072
320/107
(Continued)

FOREIGN PATENT DOCUMENTS

CN 1893171 1/2007
DE 102009014954 10/2010
(Continued)

OTHER PUBLICATIONS

JP2008059950 MT.*
(Continued)

*Primary Examiner* — Alex Usyatinsky
(74) *Attorney, Agent, or Firm* — Fletcher Yoder, P.C.

(57) ABSTRACT

A system includes a battery module having electrochemical cells and a housing configured to receive the electrochemical cells. The housing includes a first sidewall having a first surface and a second surface. The housing also includes cooling channels extending through the first sidewall of the housing from the first surface to the second surface, where the cooling channels are configured to permit fluid flow through the cooling channels for cooling the electrochemical cells. Each of the cooling channels includes a first cross-sectional area across the first surface of the first sidewall and a second cross-sectional area across the second surface of the first sidewall, where the first cross-sectional area is not equal to the second-cross sectional area. Each of the cooling channels also includes a tapered portion extending between the first-cross sectional area and the second cross-sectional area.

25 Claims, 11 Drawing Sheets

(51) Int. Cl.
  *H01M 10/6556* (2014.01)
  *H01M 10/6555* (2014.01)
  *H01M 10/656* (2014.01)
  *H01M 10/6562* (2014.01)
  *H01M 2/10* (2006.01)
  *H01M 10/0525* (2010.01)
(52) U.S. Cl.
  CPC ... *H01M 10/6555* (2015.04); *H01M 10/6556* (2015.04); *H01M 10/6562* (2015.04); *H01M 2/1077* (2013.01); *H01M 10/0525* (2013.01); *H01M 2220/20* (2013.01)
(58) Field of Classification Search
  CPC .......... H01M 10/6556; H01M 2/1077; H01M 10/0525; H01M 2220/20
  See application file for complete search history.

(56) References Cited

U.S. PATENT DOCUMENTS

| | | |
|---|---|---|
| 8,399,118 B2 | 3/2013 | Gadawski et al. |
| 2001/0046624 A1 | 11/2001 | Goto et al. |
| 2003/0162084 A1 | 8/2003 | Shigeta et al. |
| 2004/0081885 A1 | 4/2004 | Ziegler et al. |
| 2007/0009787 A1* | 1/2007 | Straubel ................ H01M 2/105 429/99 |
| 2008/0187820 A1* | 8/2008 | Nakano .................... H01G 2/08 429/83 |
| 2008/0206634 A1 | 8/2008 | Shimoyama |
| 2009/0305124 A1 | 12/2009 | Ahn et al. |
| 2013/0273829 A1 | 10/2013 | Obasih et al. |

FOREIGN PATENT DOCUMENTS

| | | |
|---|---|---|
| JP | 2008059950 | 3/2008 |
| JP | 2013110080 A | 6/2013 |
| WO | 2013065945 A1 | 5/2013 |

OTHER PUBLICATIONS

DE 2009914954MT.*
CN1893171MT.*
Invitation to Pay Additional Fees and, Where Applicable, Protest Fee for International Application No. PCT/US2014/048208 dated Nov. 12, 2014.
CN 201480040722.8 First Office Action dated Mar. 24, 2017.

* cited by examiner

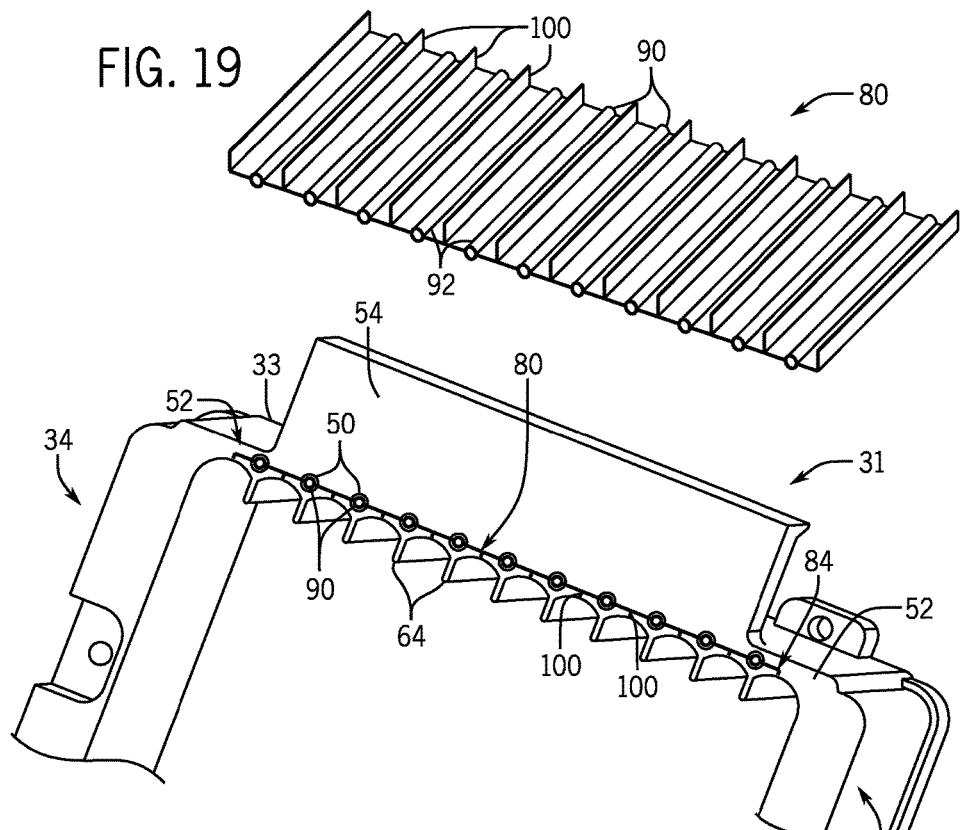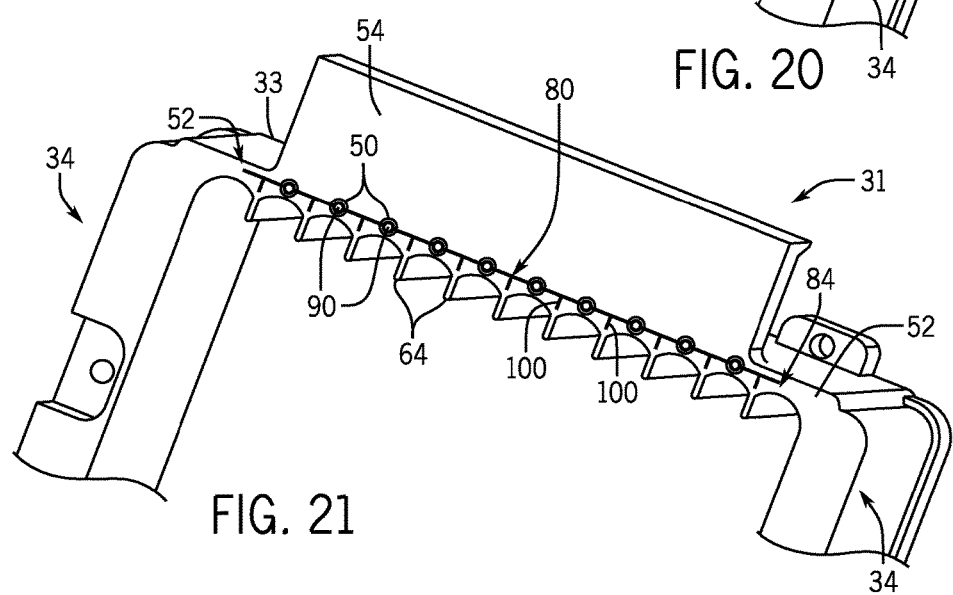

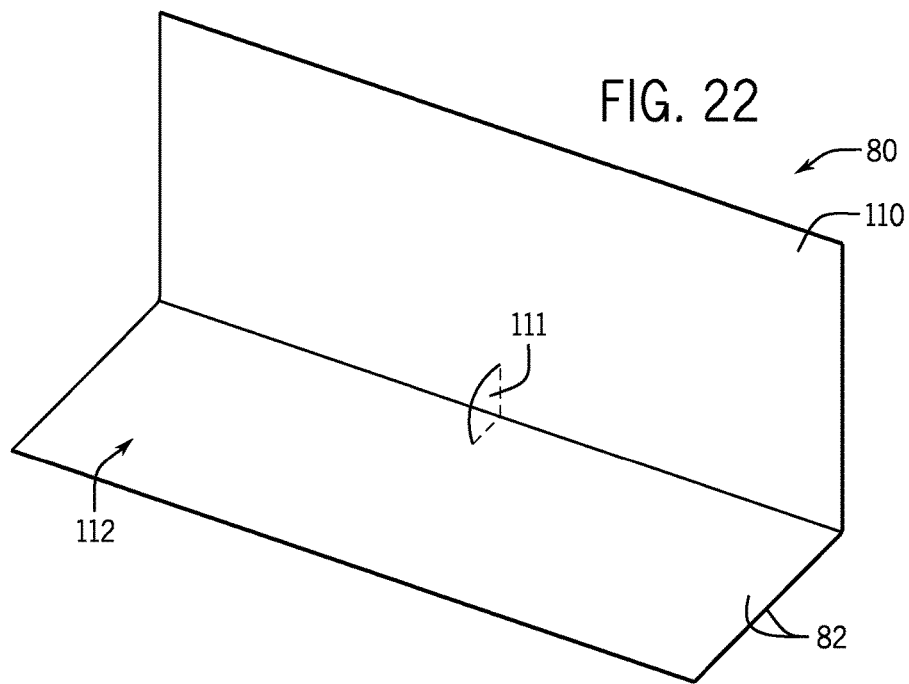
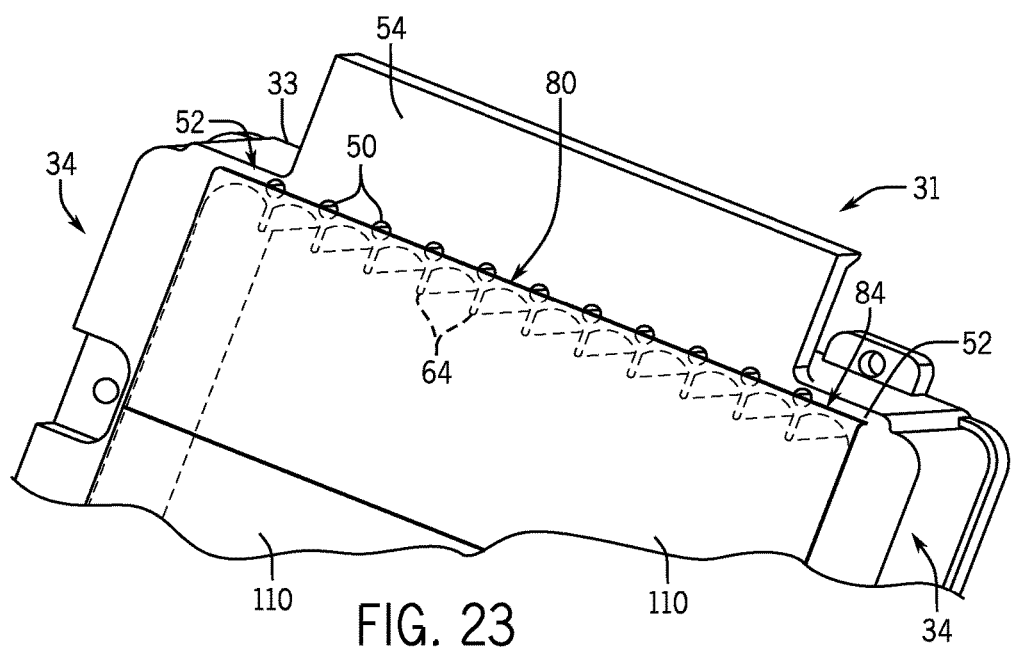

COOLING SYSTEM AND METHOD FOR LITHIUM-ION BATTERY MODULE

CROSS REFERENCE TO RELATED APPLICATIONS

This application claims priority to and the benefit of U.S. Provisional Application Ser. No. 61/858,364, entitled "ENHANCED PASSIVE COOLING METHOD FOR LITHIUM-ION BATTERY MODULES AND SYSTEM", filed Jul. 25, 2013, which is hereby incorporated by reference in its entirety for all purposes.

BACKGROUND

The disclosure relates generally to the field of batteries and battery modules. More specifically, the present disclosure relates to a cooling system for lithium-ion battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of PHEVs.

As technology continues to evolve, there is a need to provide improved power sources, particularly battery modules, for such vehicles. For example, in traditional configurations, battery modules may include bulky or complex features or systems configured to cool the battery module. Bulky or large cooling features may increase a weight, size, or volume of the battery module, thereby decreasing the battery module's energy density and/or increasing the battery module's cost. Further, complex cooling features may complicate assembly and/or manufacturing of the battery module and its components, which may contribute to an increase in the cost of the battery module.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to a battery module having electrochemical cells and a housing configured to receive the electrochemical cells. The housing includes a first sidewall having a first surface and a second surface. The housing also includes cooling channels extending through the first sidewall of the housing from the first surface to the second surface, where the cooling channels are configured to permit fluid flow through the cooling channels for cooling the electrochemical cells. Each of the cooling channels includes a first cross-sectional area across the first surface of the first sidewall and a second cross-sectional area across the second surface of the first sidewall, where the first cross-sectional area is not equal to the second-cross sectional area. Each of the cooling channels also includes a tapered portion extending between the first-cross sectional area and the second cross-sectional area.

The present disclosure also relates to a housing having a first sidewall and a second sidewall disposed opposite the first sidewall. The housing also includes internal slots disposed between the first and second sidewalls of the housing and defined by partitions extending inwardly from the first and second sidewalls. The internal slots are configured to receive electrochemical cells and the partitions are spaced such that each internal slot is sized to accommodate one or more electrochemical cells. The first and second sidewalls of the housing include a top surface configured to be disposed proximate terminals of the electrochemical cells and a bottom surface disposed opposite the top surface. The first and second sidewalls also include cooling channels extending through the first and second sidewalls from the top surface to the bottom surface. The cooling channels are configured to permit fluid flow therethrough proximate the sides of the electrochemical cells for cooling the electrochemical cells by heat transfer from the electrochemical cells, through at least the housing, and to the plurality of cooling channels. Each cooling channel is tapered from the top surface to the bottom surface or from the bottom surface to the top surface.

The present disclosure also relates to a housing for a battery module, where the housing comprises at least one sidewall configured to be disposed along sides of electrochemical cells received by the housing. The at least one sidewall includes a top surface configured to be disposed proximate terminals of the electrochemical cells, a bottom surface disposed opposite the top surface, cooling channels extending through the at least one sidewall from the top surface to the bottom surface, and a horizontal cavity extending within the at least one sidewall and coupled to the cooling channels. The housing also includes a cooling insert configured to be disposed within the horizontal cavity such that the cooling insert at least partially extends through the plurality of cooling channels.

DRAWINGS

FIG. 19 is a perspective view of an embodiment of the cooling insert of FIG. 11 configured to be disposed in a portion of a housing of a battery module;

FIG. 20 is a bottom perspective view of a portion of an embodiment of the housing of FIG. 3 having the cooling insert of FIG. 19;

FIG. 21 is a bottom perspective view of a portion of an embodiment of the housing of FIG. 3 having the cooling insert of FIG. 19;

FIG. 22 is a perspective view of an embodiment of the cooling insert of FIG. 11 configured to be disposed in a portion of a housing of a battery module; and FIG. 23 is a bottom perspective view of a portion of an embodiment of the housing of FIG. 3 having the cooling insert of FIG. 22.

DETAILED DESCRIPTION

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. The individual electrochemical cells may be positioned in a housing of the battery module. The housing may retain each of the individual electrochemical cells in a desired position and may include various thermal management features for cooling the electrochemical cells. For example, in accordance with present embodiments, the housing may include cooling channels extending in a particular direction through the housing and configured to cool the electrochemical cells. The cooling channels may also be tapered or shaped to promote fluid flow through the cooling channels, where the fluid flow may enhance cooling of the electrochemical cells. Further, a thermally conductive cooling insert may be disposed in the housing proximate the cooing channels to conduct and concentrate heat extracted from the electrochemical cells to an area proximate the cooling channels. This may enable enhanced heat extraction by fluid (e.g., air) flowing through the cooling channels. Indeed, it is presently recognized that cooling channels configured in accordance with the present disclosure may enhance cooling of the electrochemical cells using ambient conditions, thereby reducing or obviating reliance on more active cooling methods (e.g., forced fluid flow).

By including the tapered cooling channels and/or the cooling insert directly in, for example, a sidewall of the housing of the battery module, a size, weight, and/or volume of the battery module may be reduced, thereby decreasing cost and increasing energy density of the battery module compared to traditional configurations with separate or more complex, bulky cooling systems. Further, by including the cooling channels and/or the cooling insert within the sidewalls of the housing, manufacturing and assembly of the battery module may be made less complicated compared to traditional configurations with separate or more complex, bulky cooling systems.

Figure 1:
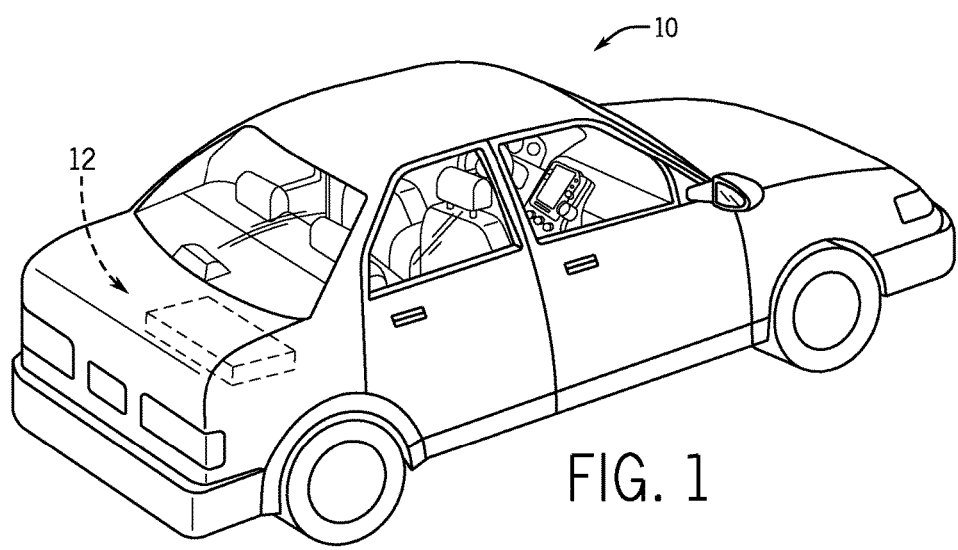
FIG. 1 is a perspective view of a vehicle having a battery module configured in accordance with present embodiments to provide power for various components of the vehicle.

With the foregoing in mind, the present embodiments relating to cooling channels and associated features may be applied to any battery or battery system, in particular battery systems employed in an xEV. For example, FIG. 1 is a perspective view of an xEV 10 in the form of an automobile (e.g., a car) having a battery system 12 in accordance with present embodiments for providing a portion of the motive power for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 12 to power at least one or more accessories (e.g., AC, lights, consoles, etc.), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 12 is illustrated in FIG. 1 as being positioned in the trunk or rear of the vehicle, according to other embodiments, the location of the battery system 12 may differ. For example, the position of the battery system 12 may be selected based on the available space within a vehicle, the desired weight balance of the vehicle, the location of other components used with the battery system 12 (e.g., battery control units, measurement electronics, etc.), and a variety of other considerations.

Figure 2:
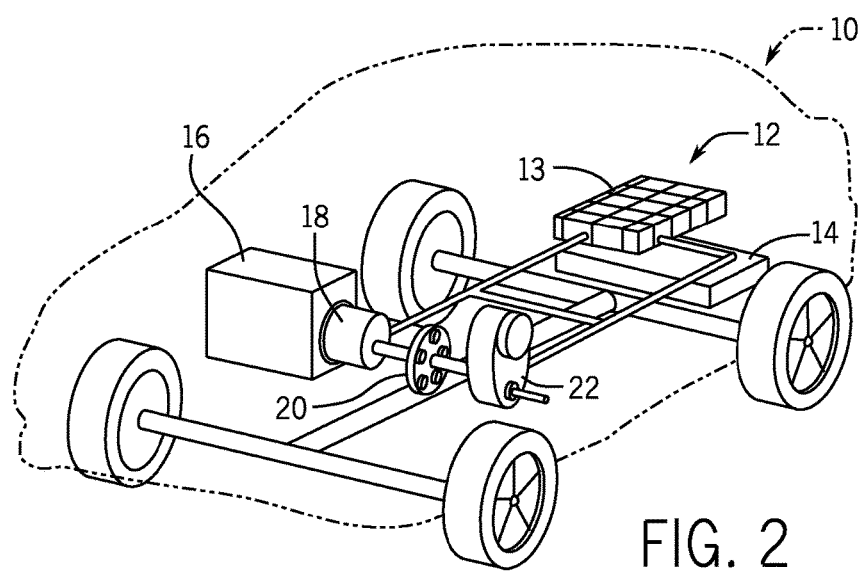
FIG. 2 is a cutaway schematic view of an embodiment of the vehicle and the battery module of FIG. 1.

The xEV 10 may be an HEV having the battery system 12, which includes one or more battery modules 13, as illustrated in FIG. 2, where each of the battery modules 13 includes one or more electrochemical cells. In particular, the battery system 12 illustrated in FIG. 2 is disposed toward the rear of the vehicle 10 proximate a fuel tank 14. In other embodiments, the battery system 12 may be provided immediately adjacent the fuel tank 14, provided in a separate compartment in the rear of the vehicle 10 (e.g., a trunk), or provided in another suitable location in the HEV 10. Further, as illustrated in FIG. 2, the HEV 10 includes an internal combustion engine 16 for times when the HEV 10 utilizes gasoline power to propel the vehicle 10. The HEV 10 also includes an electric motor 18, a power split device 20, and a generator 22 as part of the drive system.

The HEV 10 illustrated in FIG. 2 may be powered or driven by the battery system 12 alone, by the combustion engine 16 alone, or by both the battery system 12 and the combustion engine 16. It should be noted that, in other embodiments, other types of vehicles and configurations for the vehicle drive system may be utilized, and that the schematic illustration of FIG. 2 should not be considered to limit the scope of the subject matter described in the present application. According to various embodiments, the size, shape, and location of the battery system 12, the corresponding battery modules 13, and the type of vehicle, among other features, may differ from those shown or described.

Figure 3:
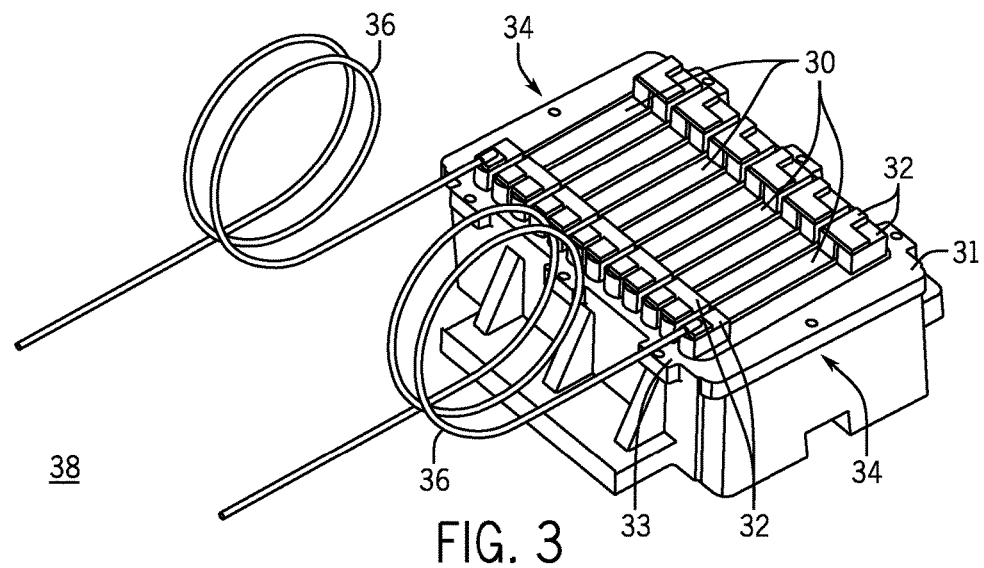
FIG. 3 is a perspective view of an embodiment of a portion of battery module for use in the vehicle of FIG. 1, the battery module having a housing with cooling channels.

For example, different vehicles 10 may include different types of battery modules 13. One such embodiment of the battery module 13 is shown in a perspective view in FIG. 3. In the illustrated embodiment, the battery module 13 includes twelve electrochemical cells 30 disposed within a housing 31, although the number of electrochemical cells 30 may vary depending on the application, vehicle, or desired power considerations. Certain portions of the electrochemical cells 30, such as their casings, may be electrically isolated from each other via features disposed on either the electrochemical cells 30 or the housing 31, or both. In the illustrated embodiment, terminals of the electrochemical cells 30 (e.g., extending upwardly from within the electrochemical cells 30) are coupled together via bus bar cell interconnects 32, where the terminals in the illustrated embodiment are completely covered by the bus bar cell interconnects 32. The electrochemical cells 30 may be coupled together via the bus bar cell interconnects 32 in series or in parallel. In some embodiments, some of the electrochemical cells 30 may be coupled in series and some of the electrochemical cells 30 may be coupled in parallel. Any appropriate combination of series and parallel interconnections is within the scope of the present disclosure.

In addition to coupling the electrochemical cells 30 together, the bus bar cell interconnects 32 may interface with a top surface 33 of the housing 31. For example, in the illustrated embodiment, the bus bar cell interconnects 32 fit over the terminals of the electrochemical cells 30 and rest against the top surface 33 of the housing 31. In other embodiments, the bus bar cell interconnects 32 may snap into the top surface 33 of the housing 31 or may be otherwise coupled to the housing 31. Proximate both ends 34 of the illustrated housing 31, leads 36 are electrically coupled to the electrochemical cells 30, or to their associated bus bar cell interconnects 32, where the leads 36 extend away from the battery module 13 and couple to a load 38. Thus, the leads 36 provide an electrical path between the battery module 13 and the load 38 to power the load 38 via a charge generated and provided by the electrochemical cells 30 of the battery module 13.

Figure 4:
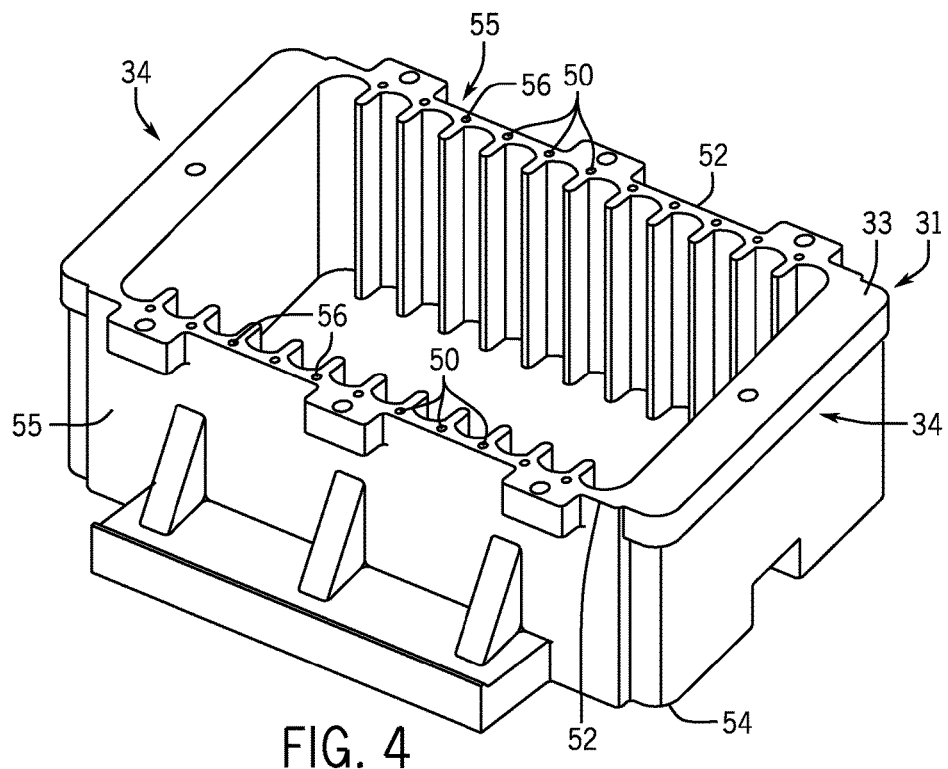
FIG. 4 is a perspective view of an embodiment of the housing for the battery module of FIG. 3, in accordance with an aspect of the present disclosure.

In addition to these electrical features, the battery module 13 may also include one or more thermal management features under the bus bar cell interconnects 32, between the bus bar cell interconnects 32, or otherwise away from or outside the bus bar cell interconnects 32. For example, as depicted in a perspective view of an embodiment of the housing 31 in FIG. 4, the housing 31 includes a number of cooling channels 50 extending through sidewalls 52 of the housing 31. Specifically, the cooling channels 50 extend from the top surface 33 of the housing 31 to a bottom surface 54 of the housing 31, and the sidewalls 52 each extend between the ends 34 of the housing 31. The cooling channels 50 may provide enhanced thermal management of the battery module 13 by, for example, increasing a heat exchange area of the battery module 13. That is, with the cooling channels 50, the heat exchange area (e.g., a total surface area with which to exchange heat with a heat exchange fluid) proximate the sidewalls 52 of the housing 31 includes not only outer surfaces 55 of the sidewalls 52, but also inner surfaces 56 of the cooling channels 50. In addition, the cooling channels 50 enable heat exchange to occur closer to the electrochemical cells 30 than would otherwise be feasible. In this regard, it should be noted that thermal management is enhanced as a result of the cooling channels 50 being disposed closer to the electrochemical cells 30 in the housing 31 than the outer surfaces 55 of the sidewalls 52, which enables a reduced distance between heat generation (from the electrochemical cells 30) and heat extraction (by a heat exchange fluid in the cooling channels 50). Thus, heat may be extracted from the battery module 13 more quickly than it would be if the cooling channels 50 were not included.

It should be noted that, in some embodiments, the housing 31, and in particular the sidewalls 52 of the housing 31, may be made of a base material comprising a polymer (e.g., plastic). The housing 31 may be injection molded with the polymeric material. Further, the cooling channels 50 may be formed in the polymer sidewalls 52 of the housing 31 while the housing 31 is manufactured (e.g., injection molded). Alternatively, in some embodiments, the cooling channels 50 may be drilled, molded, or otherwise formed in the sidewalls 52 of the housing 31 after the basic form of the housing 31 is manufactured.

Further, the cooling channels 50 may be configured (e.g., by way of their shape, orientation, and size) to promote fluid flow (e.g., of air) through the cooling channels 50, thereby enhancing heat exchange compared to simply transferring heat to substantially still air in another passive arrangement. The cooling channels 50 may be configured to generate a velocity of fluid flow through the cooling channels 50 (as opposed to transferring heat to still air), which increases an amount of fluid flowing over the heat exchange surface (e.g., inside the cooling channels 50) in a given time period. This may increase heat transfer (cooling) rates. While the cooling channels 50 may be used without active cooling equipment, fluid flow through the cooling channels 50 in the sidewalls 52 of the housing 31 may be directly promoted via a fan or blower, as described in detail with reference to later figures. Further, in some embodiments, a liquid fluid may be routed through the cooling channels 50 via a pump or some other device.

Figure 5:
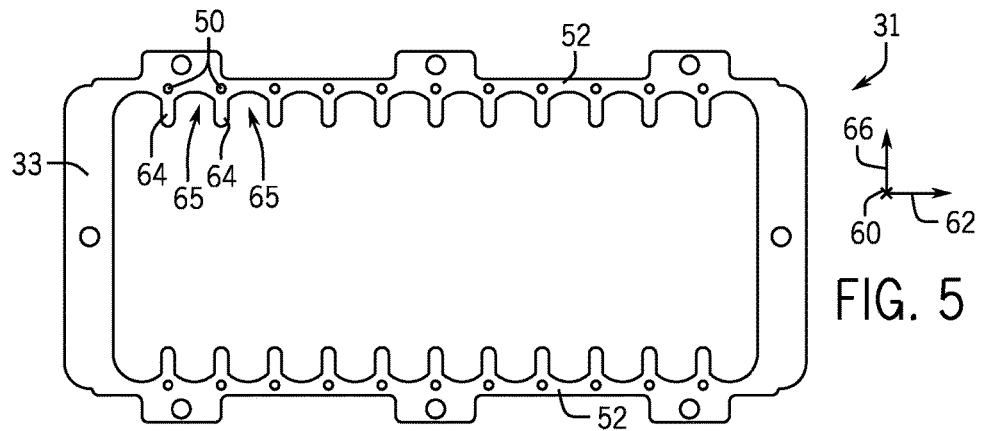
FIG. 5 is a top view of an embodiment of the housing of FIG. 3 having circular cooling channels, in accordance with an aspect of the present disclosure.
Figure 6:
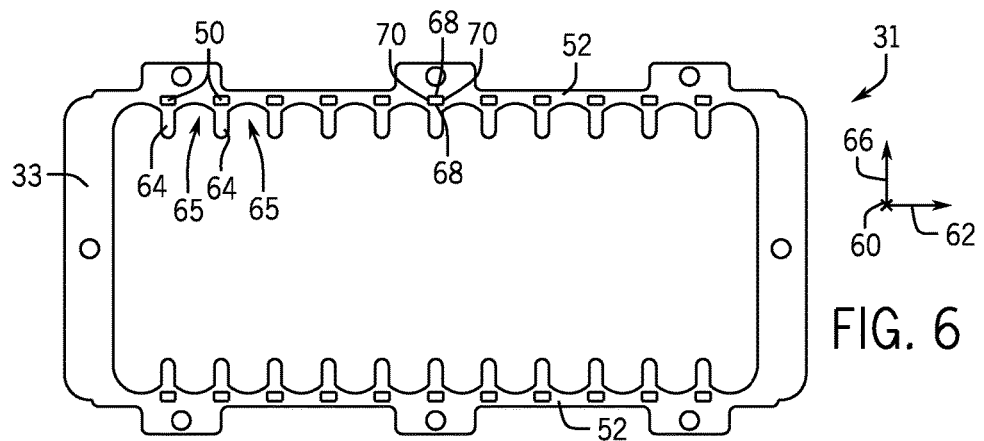
FIG. 6 is a top view of an embodiment of the housing of FIG. 3 having rectangular cooling channels, in accordance with an aspect of the present disclosure.
Figure 7:
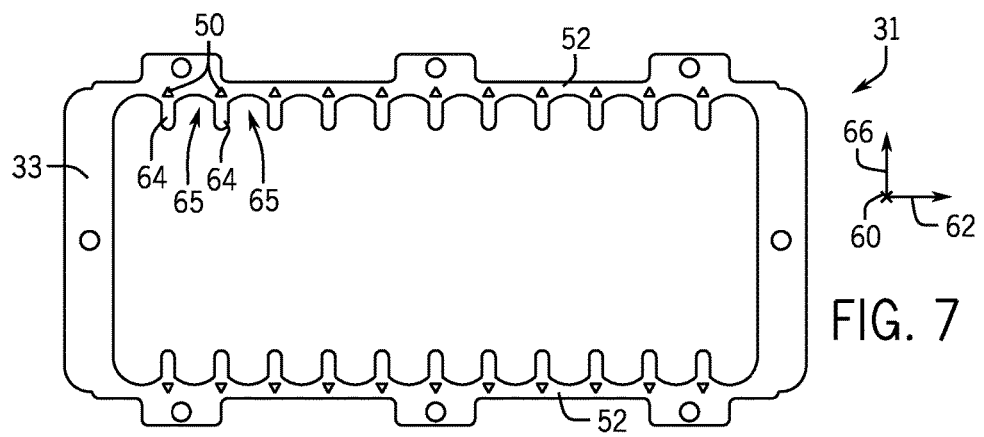
FIG. 7 is a top view of an embodiment of the housing of FIG. 3 having triangular cooling channels, in accordance with an aspect of the present disclosure.

Example embodiments of the housing 31 having cooling channels 50 with particular shapes are shown in FIGS. 5-7. The cooling channels 50 extend through the sidewalls 52 of the housing 31 from the top surface 33 of the housing 31 downward, in direction 60. In the illustrated embodiments, the sidewalls 52 extend in direction 62 and the cooling channels 50 are spaced (e.g., evenly spaced) across the sidewalls 52 with respect to direction 62 (e.g., along a length direction of the housing 31). For example, the cooling channels 50 may be aligned with partitions 64 extending into the housing 31 in direction 66, where the partitions 64 are spaced (e.g., evenly) across the sidewalls 52 in direction 62 and are configured to separate the electrochemical cells 30 in the housing 31 from each other. For example, the partitions 64 may define slots 65 within the housing 31, where each of the slots 65 is configured to retain one or more electrochemical cells 30 and each cooling channel 50 may be aligned with a corresponding one of the partitions 64. In other embodiments, however, the cooling channels 50 may each be positioned between two respective partitions 64.

In general, the cooling channels 50 may be shaped, sized, and/or oriented to promote or enhance fluid flow through the cooling channels 50 for cooling the electrochemical cells 30 disposed in the housing 31. For example, in FIG. 5, the cooling channels 50 are circular, in FIG. 6, the cooling channels 50 are rectangular, and in FIG. 7, the cooling channels 50 are triangular. Generally, the cooling channels 50 may have any suitable cross-sectional geometries, including but not limited to ovals, ellipses, half circles, or teardrops. Further, the cooling channels 50 may not all have the same shape. For example, the cooling channels 50 across one sidewall 52 of any embodiment of the housing 31 may alternate between a first shape (e.g., a circle) and a second shape (e.g., a square). Or, the cooling channels 50 on one sidewall 52 of the housing 31 may be a first shape (e.g., a circle), while the cooling channels 50 on the other sidewall 52 of the housing 31 may be a second shape (e.g., a square). Further still, the shape of the cooling channel 50 may be oriented differently depending on the embodiment of the battery module 13. For example, the rectangular cooling channels 50 in FIG. 6 include long sides 68 disposed parallel to direction 62 and short sides 70 disposed parallel to direction 66. In another embodiment, the long sides 68 may be disposed parallel to direction 66 and the short sides 70 may be disposed parallel to direction 62.

Figure 8:
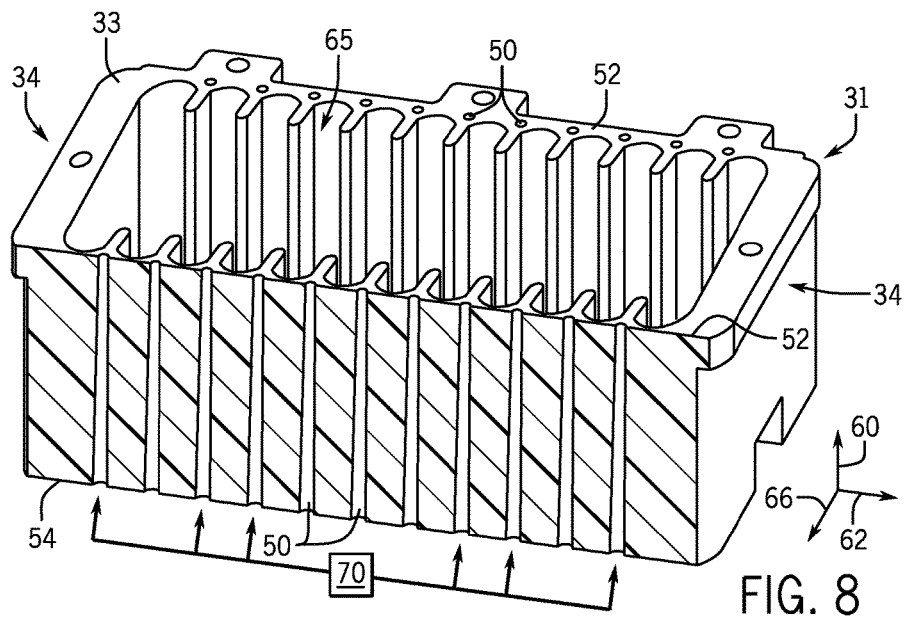
FIG. 8 is a cutaway perspective view of an embodiment of the housing of FIG. 3 having tapered circular cooling channels, in accordance with an aspect of the present disclosure.
Figure 9:
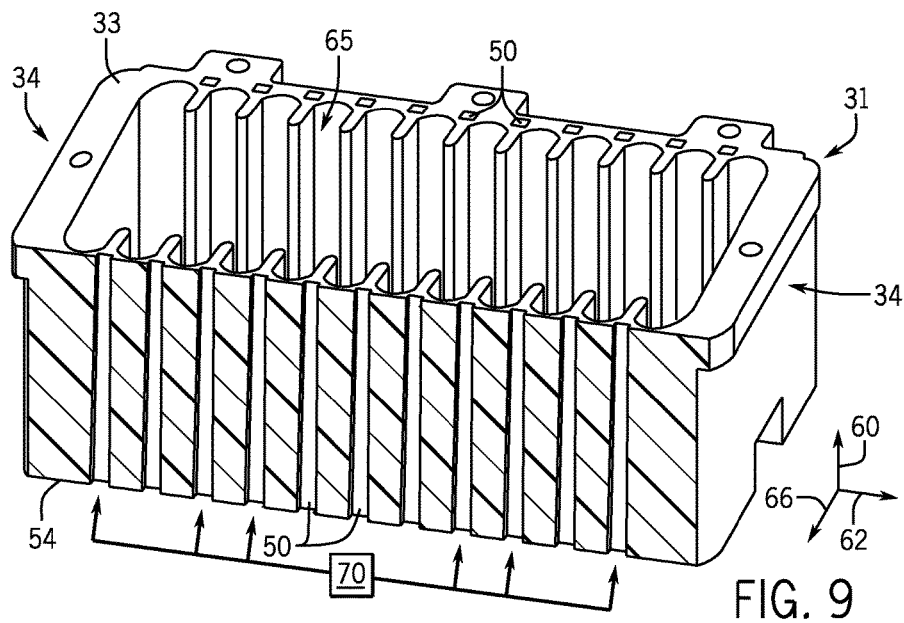
FIG. 9 is a cutaway perspective view of an embodiment of the housing having tapered rectangular cooling channels, in accordance with an aspect of the present disclosure.
Figure 10:
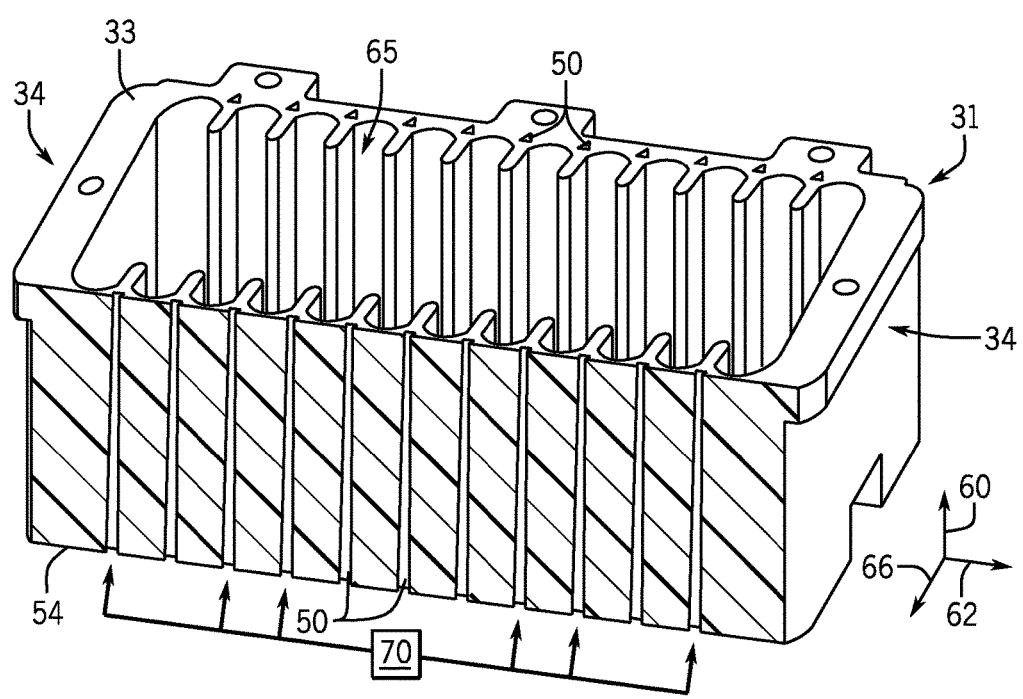
FIG. 10 is a cutaway perspective view of an embodiment of the housing having tapered triangular cooling channels, in accordance with an aspect of the present disclosure.

Further, the size of the cooling channels 50 may vary in, for example, direction 60 within the sidewalls 52 of the housing 31 to initiate or enhance a chimney effect through the cooling channels 50. For example, FIGS. 8-10 are cutaway perspective views of embodiments of the housing 31 having tapered cooling channels 50. In the illustrated embodiments, the cooling channels 50 are tapered from a first cross-sectional size at the bottom surface 54 of the housing 31 to a second-cross sectional size, smaller than the first, at the top surface 33 of the housing 31. In other words, a cross-sectional area of the each cooling channel 50 is larger at the bottom surface 54 of the housing 31 than at the top surface 33 of the housing 31, and each cooling channel 50 is tapered from the bottom surface 54 to the top surface 33. Any shaped cooling channel 50 in accordance with present embodiments may be tapered. For example, FIG. 8 is an embodiment of the housing 31 having tapered circular cooling channels 50, FIG. 9 is an embodiment of the housing 31 having tapered rectangular cooling channels 50, and FIG. 10 is an embodiment of the housing 31 having tapered triangular cooling channels 50. Additionally or alternatively, the housing 31 may also include tapered cooling channels 50 having ovals, ellipses, half circles, or tear-drop shapes. Further, any of the aforementioned cooling channels 50 may, in another embodiment, be tapered from the top surface 33 of the housing 31 to the bottom surface 54 of the housing instead of from the bottom surface 54 of the housing to the top surface 33 of the housing 31. The orientation of the taper may depend on, for example, an expected or desired direction of fluid flow through the cooling channel 50, as described below. Also, the desired direction of fluid flow could depend on the orientation of the electrochemical cells 30 in the housing 31 (e.g., based on hot spots).

In general, each tapered cooling channel 50 is configured to generate a pressure difference across the tapered cooling channel 50 in direction 60. The tapered cooling channel 50 restricts a fluid flow through the cooling channel 50, generating a pressure difference which may direct and/or accelerate the fluid flow (e.g., create a chimney effect). In other words, the fluid flow is restricted on one side relative to the other (e.g., top vs. bottom), increasing or maintaining the velocity of the fluid flow through each cooling channel 50. An increase or maintenance of the velocity of the fluid flow traveling through the tapered cooling channel 50 may increase the mass flow of the fluid, thereby increasing a heat transfer coefficient of the fluid flow. In this way, the tapered cooling channel 50 increases heat transfer efficiency of the battery module 13.

As set forth above, fluid flow into the cooling channel 50 may be promoted passively or actively. For example, in the embodiments shown in FIGS. 8-10, a fan 70 may be disposed below the housing 31, where the fan 70 increases circulation of fluid (e.g., air) into and through the cooling channels 50. The taper in the cooling channels 50 may maintain or increase velocity of the air flowing through the cooling channels 50 in the manner set forth above.

Alternatively or additionally, fluid flow (e.g., air flow) generated by the fan, or a different fluid flow proximate the housing 31, may induce a chimney effect (e.g., stack effect) through each of the cooling channels 50. For example, in embodiments without the fan 70, heat may be transferred to air within the cooling channels 50 while the battery module 13 is operating. As the hot air rises within the cooling channels 50 due to buoyancy, cooler air from outside of the housing 31 replaces the hot air. This movement of air may induce a draft (e.g., fluid or air flow) through the cooling channels 50 from the bottom surface 54 to the top surface 33, which may enhance heat transfer in the same manner described above with reference to the fan 70. Again, at least a portion of each cooling channel 50 may be tapered to maintain or increase velocity of the induced draft through the cooling channel 50.

Figure 11:
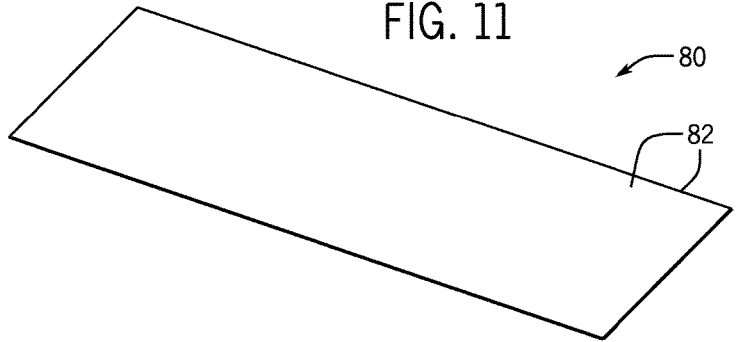
FIG. 11 is a perspective view of an embodiment of a cooling insert configured to be disposed in a portion of a housing of a battery module.
Figure 12:
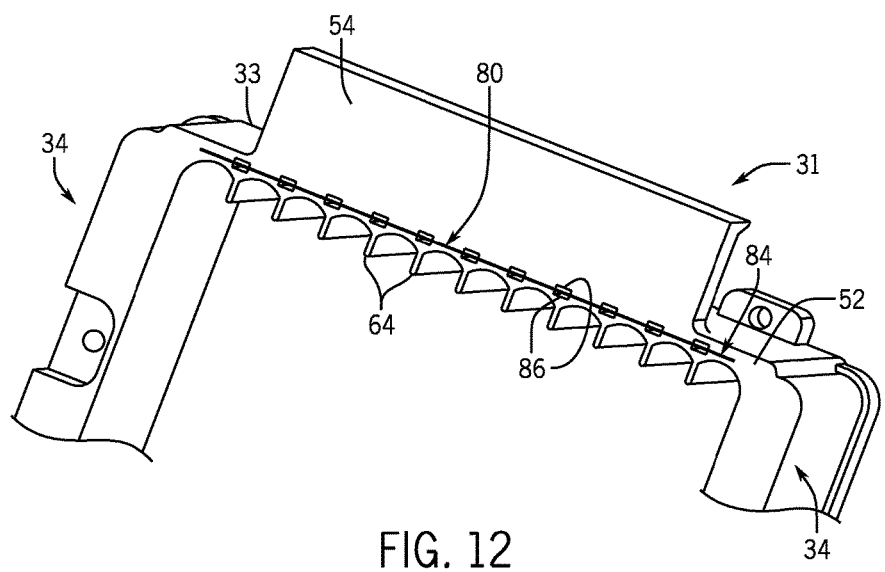
FIG. 12 is a bottom perspective view of a portion of an embodiment of the housing of FIG. 3 having the cooling insert of FIG. 11.

In addition to the tapered cooling channels 50 and various fluid flows described above, the housing 31 of the battery module 13 may also include a cooling insert or a cooling plate disposed within one or more of the sidewalls 52 of the housing 31 to further facilitate cooling and heat transfer. For example, FIGS. 11 and 12 show, respectively, bottom perspective views of embodiments of a cooling insert 80 and the cooling insert 80 disposed in one of the sidewalls 52 of the housing 31. The cooling insert 80 may be made of a metal material or another material that is more thermally conductive than the polymeric sidewalls 52 of the housing 31. Thus, the cooling insert 80 may be configured to conduct heat away from the electrochemical cells 30 and the housing 31 and toward the cooling channels 50, as described below.

In the illustrated embodiments, the cooling insert 80 is thin (e.g., thinner than the sidewalls 52 of the housing 31) and includes two broad, continuously flat faces 82 disposed opposite each other. The sidewall 52 of the housing 31 in FIG. 12 includes a horizontal cavity 84 extending, for example, through the sidewall 52 from the top surface 33 of the sidewall 52 to the bottom surface 54 of the sidewall 52. The horizontal cavity 84 in FIG. 12 also extends through the cooling channels 50. In other embodiments, the horizontal cavity 84 may extend between the top surface 33 and the bottom surface 54, but may not extend all the way to the top surface 33 and/or the bottom surface 54. In either configuration, the horizontal cavity 84 is configured to receive (e.g., encircle or enclose) the cooling insert 80, such that the cooling insert 80 is disposed within the cooling channel 50 (e.g., at least partially extending within each of the cooling channels 50). Inclusion of the cooling insert 80, as described herein, may separate each cooling channel 50 into two distinct segments 86, which may further increase the heat exchange surface area of the battery module 13 for enhanced thermal management of the battery module 13. Because the cooling insert 80 may be made of a more thermally conductive material than the housing 31, the cooling insert 80 may be configured to extract heat from the electrochemical cells 30 disposed within the housing 31 of the battery module 13, and from the housing 31 itself, such that the extracted heat is concentrated in the cooling insert 80 proximate (or within) the cooling channels 50. That is, the cooling insert 80 may create an additional pathway for thermal conduction away from the electrochemical cells 30 and to the fluid within the cooling channels 50. It should be noted that, in some embodiments, the cooling insert 80 may be inserted (e.g., removably) into the horizontal cavity 84, while in other embodiments, the cooling insert 80 may be over molded with the housing 31 (e.g., in the sidewalls 52 of the housing 31) during production of the housing 31, or disposed in the horizontal cavity 84 in some other manner.

Figure 13:
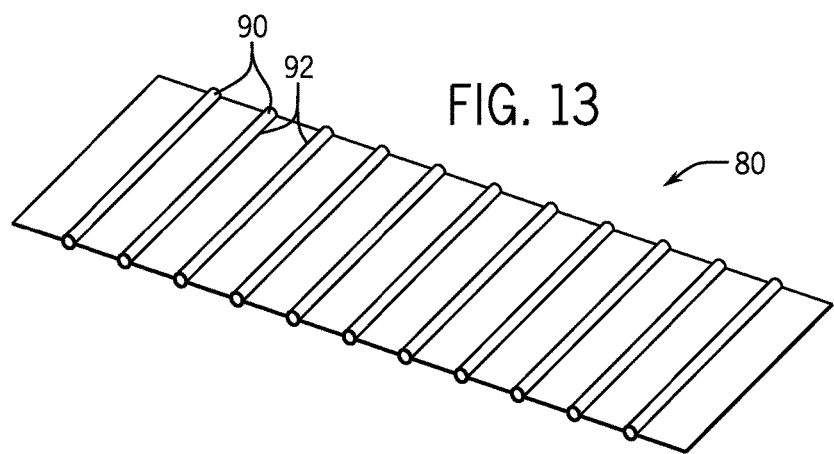
FIG. 13 is a perspective view of an embodiment of the cooling insert of FIG. 11 configured to be disposed in a portion of a housing of a battery module.
Figure 14:
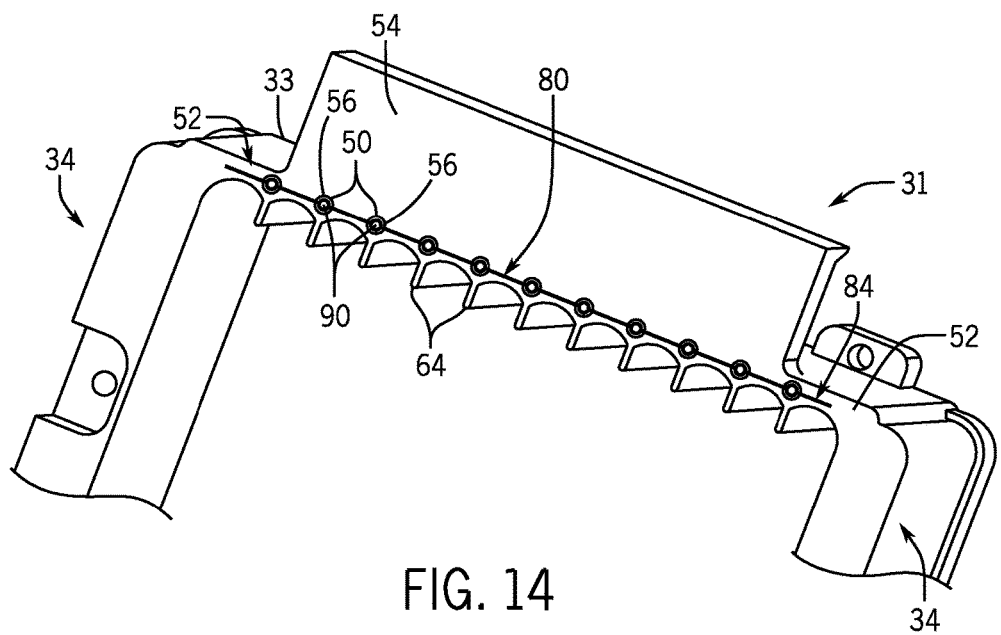
FIG. 14 is a bottom perspective view of a portion of an embodiment of the housing of FIG. 3 having the cooling insert of FIG. 13.

In some embodiments, the cooling insert 80 may be textured or include other features that enhance thermal management (e.g., by increased surface area). In other words, in certain embodiments, the cooling insert 80 may not include two broad, continuously flat faces 82 disposed opposite each other. For example, FIGS. 13 and 14 show, respectively, an embodiment of the cooling insert 80 having cooling tubes 90 and the cooling insert 80 (having the cooling tubes 90) disposed in one of the sidewalls 52 of the housing 31. In the illustrated embodiments, the cooling tubes 90 are spaced (e.g., evenly spaced) across the cooling insert 80, and each cooling tube 90 is configured to fit into a corresponding one of the cooling channels 50 in the sidewall 52 of the housing 31. By including the cooling tubes 90 on the cooling insert 80, heat conducted by the cooling insert 80 from the electrochemical cells 30 disposed in the housing 31 may be concentrated in the cooling insert 80 around circumferences of the cooling channels 50. Thus, in certain embodiments, fluid traveling through the cooling channels 50 may always be in contact with the heat conductive cooling tubes 90 of the cooling insert 80, which may enhance a rate of heat transfer to the fluid.

Additionally, because the cooling insert 80 may be formed from one or more materials having a high thermal conductivity than a base material of the housing 31 (e.g., a polymer), there may be an increased rate of thermal transfer to the fluid in the cooling channels 50, thereby enhancing thermal management of the electrochemical cells 30. Further, the cooling insert 80, by virtue of its higher thermal conductivity, may more evenly distribute heat along the direction 60, which may also facilitate heat transfer to the fluid in the cooling channels 50. This may further increase the previously described heat transfer coefficient, enabling enhanced heat transfer and, thus, enhanced thermal management of the battery module 13.

It should be noted that the each cooling tube 90 may be tapered such that an outer contour 92 of each cooling tube 90 corresponds in shape to the inner surface 56 of the corresponding cooling channel 50. The outer contour 92 of each cooling tube 90 may also correspond in size (e.g., cross-sectional size) to the inner surface 56 of the corresponding cooling channel 50 or, alternatively, may be smaller than the inner surface 56 of the corresponding cooling channel 50. Further, it should be noted that the cooling tubes 90 may have any cross-sectional geometry, including but not limited to circles, ovals, ellipses, half circles, tear-drops, etc. It is also within the scope of the present disclosure for the shape of the cooling tubes 90 to not correspond to the shape of the cooling channels 50, in other embodiments.

Figure 15:
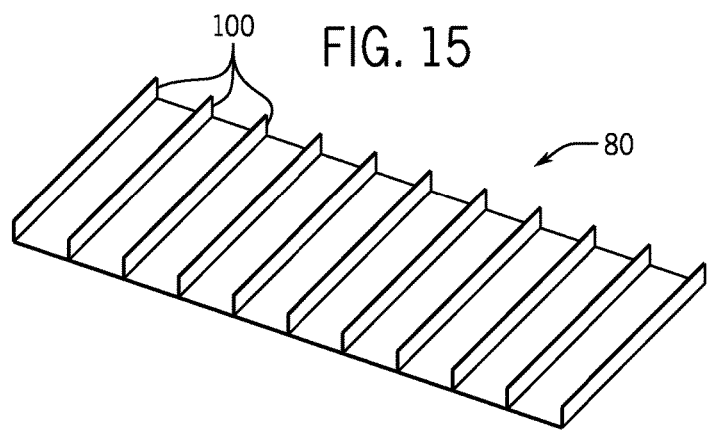
FIG. 15 is a perspective view of an embodiment of the cooling insert of FIG. 11 configured to be disposed in a portion of a housing of a battery module.
Figure 16:
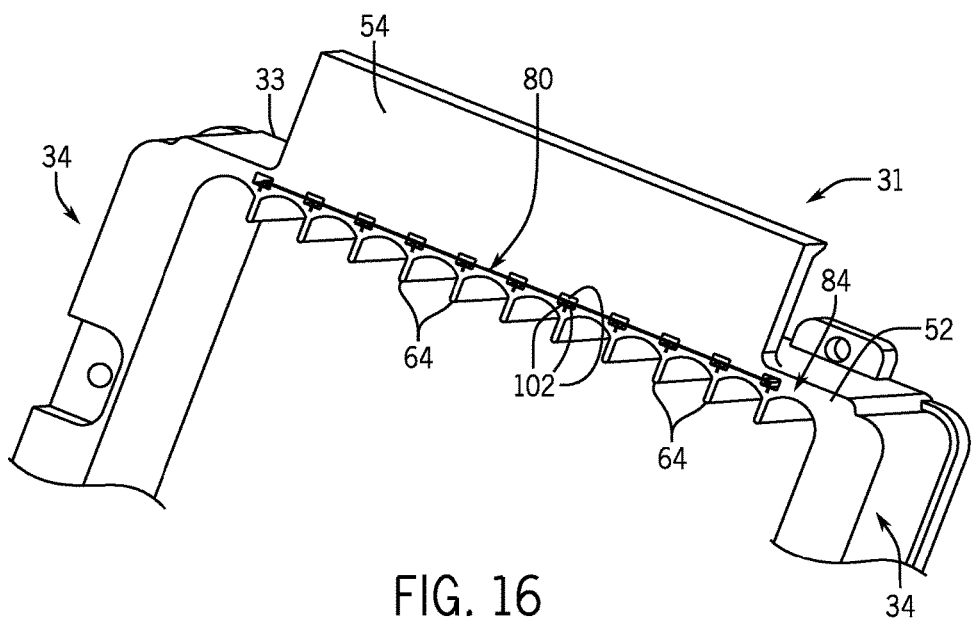
FIG. 16 is a bottom perspective view of a portion of an embodiment of the housing of FIG. 3 having the cooling insert of FIG. 15.

The surface of the cooling insert 80 may alternatively include cooling fins as opposed to cooling tubes 90, or may include a combination thereof. For example, FIGS. 15 and 16 show, respectively, perspective views of an embodiment of the cooling insert 80 having cooling fins 100 and the cooling insert 80 (having the cooling fins 100) disposed in one of the sidewalls 52 of the housing 31. In the illustrated embodiments, the cooling fins 100 are spaced (e.g., evenly spaced) across the cooling insert 80 and are oriented in the same direction.

Each of the cooling fins 100 is configured to be at least partially disposed in a corresponding one of the cooling channels 50. Indeed, as shown in FIG. 16, the cooling fins 100 separate each of the cooling channels 50 into three distinct segments 102, which may further increase the heat exchange area of the battery module 13 for enhanced thermal management of the battery module 13 (e.g., the electrochemical cells 30 in the battery module 13), as previously described. Further, the cooling fins 100 may extend into or proximate the partitions 64 configured to separate the electrochemical cells 30, which provides a shorter distance between the electrochemical cells 30 and the cooling insert 80 (by way of the cooling fins 100 extending toward and between the electrochemical cells 30). However, it should be noted that, in other embodiments, the cooling fins 100 may be disposed between the cooling channels 50 (e.g., offset from the partitions 64). This may enable the cooling insert 80 to separate the cooling channels 50 into two distinct (e.g., equally sized) segments 86 (See FIGS. 11 and 12), which may provide a more balanced heat transfer between the two segments 86. Further, this may enable a different position of the cooling fins 100 with respect to the electrochemical cells 30 (e.g., proximate ends of the electrochemical cells 30 as opposed to between ends of the electrochemical cells 30). Indeed, in some embodiments, some cooling fins 100 may be disposed within the cooling channels 50, extending into or proximate the partitions 64, and some cooling fins 100 may be disposed between the cooling channels 50. Further still, in certain embodiments, the cooling channels 50 may be offset from (e.g., between) the partitions 64, and the cooling fins 100 may be disposed in the cooling channels 50.

Figure 17:
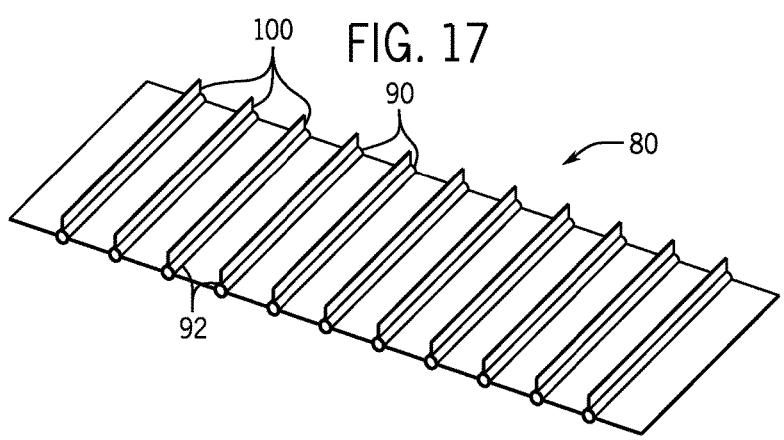
FIG. 17 is a perspective view of an embodiment of the cooling insert of FIG. 11 configured to be disposed in a portion of a housing of a battery module.
Figure 18:
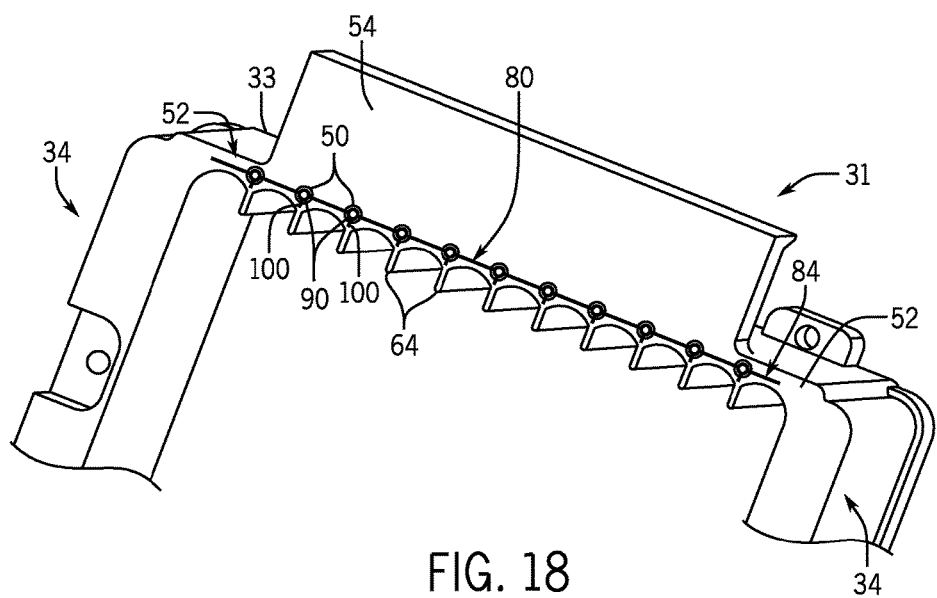
FIG. 18 is a bottom perspective view of a portion of an embodiment of the housing of FIG. 3 having the cooling insert of FIG. 17.

The present disclosure also encompasses embodiments where the cooling insert 80 includes both cooling fins 100 and cooling tubes 90. For example, FIGS. 17-21 show bottom perspective views of embodiments of the cooling insert 80 having both cooling tubes 90 and cooling fins 100. Depending on the embodiment, the cooling tubes 90 and the cooling fins 100 may be disposed one on top of the other (e.g. occupying the same cooling channel 50), or the cooling tubes 90 and the cooling fins 100 may alternate across the cooling insert 80. For example, in FIG. 17, the cooling insert 80 includes cooling tubes 90 disposed on the cooling insert 80 and cooling fins 100 extending from each of the cooling tubes 90. The cooling tubes 90, as previously described, may be tapered to match the cooling channels 100 in which the cooling tubes 90 are disposed. In FIG. 18, the cooling insert 80 of FIG. 17 is shown disposed within the horizontal cavity 84 of the sidewall 52. In the illustrated embodiment, the cooling fins 100 are configured to extend toward an interior of the housing 31 (e.g., having the electrochemical cells 30). Indeed, the cooling fins 100 may partially extend into the partitions 64 of the housing 31, such that the cooling fins 100 extend at least partially between two electrochemical cells 30 separated by one of the partitions 64. Such embodiments having the cooling fins 100, as previously described, may enable a reduced distance between the electrochemical cells 30 and the thermally conductive cooling insert 80, enhancing heat transfer to the cooling insert 80. Further, the cooling fins 100 may direct extracted heat toward the cooling tubes 90 (thereby facilitating heat transfer into the cooling channels 50). Because the cooling tubes 90 are disposed directly in the cooling channels 50 of the sidewall 52, fluid flowing through the cooling channels 50 (and, thus, the cooling tubes 90) may more readily extract heat from the cooling insert 80 (and, in general, from the battery module 13).

As noted above, the cooling fins 100 and the cooling tubes 90 may alternate across the cooling insert 80. For example, a perspective view of an embodiment of the cooling insert 80 having cooling fins 100 and cooling tubes 90 is shown in FIG. 19, where each cooling tube 90 is separated from an adjacent cooling tube 90 by one or more cooling fins 100.

With respect to certain embodiments of the housing 31, and as shown in FIG. 20, the cooling fins 100 may be disposed in the sidewall 52 of the housing 31 such that the cooling fins 100 extend between the partitions 64. Generally, the cooling channels 50 of the housing 31 may or may not be disposed between the partitions 64. In other words, depending on the embodiment, the cooling fins 100 disposed between the partitions 64 may or may not extend through cooling channels 50 in the housing 31. In the embodiment illustrated in FIG. 20, the cooling tubes 90 of the cooling insert 80 are disposed within cooling channels 50 in the housing 31 aligned with the partitions 64.

Additionally or alternatively, the cooling fins 100 may be aligned with and extending at least partially into the partitions 64. For example, a perspective view of an embodiment of the housing 31 having cooling fins 100 aligned with the partitions 64 is shown in FIG. 21, though the cooling channels 50 may or may not all be aligned with the partitions 64. In other words, the cooling fins 100, depending on the embodiment, may or may not extend into cooling channels 50 aligned with the partitions 64. In the illustrated embodiment, the cooling tubes 90 of the cooling insert 80 are aligned with cooling channels 50 of the housing 31 between the partitions 64. As described above, additional cooling channels 50 may be aligned with the partitions 64, such that the cooling fins 100 extend within the cooling channels 50 aligned with the partitions 64. In any of the above described embodiments, the cooling insert 80 may be over molded with the housing 31 (e.g., thus forming the horizontal cavity 84), or the cooling insert 80 may be inserted into the preformed horizontal cavity 84 in the sidewall 52 of the housing 31. Indeed, any and all combinations of the arrangements set forth above relating to the cooling insert 80 and the housing 31 (e.g., having the cooling channels 50 and the partitions 64) are presently contemplated.

Alternatively or in addition to any of the embodiments of the cooling insert 80 described above, the cooling insert 80 may include an extension extending from the cooling insert 80 in a cross-wise direction relative to the faces 82, and configured to fit under certain areas (e.g., bottoms) of the electrochemical cells 30. For example, FIGS. 22 and 23 show, respectively, perspective views of an embodiment of the cooling insert 80 having a cross-wise extension 110 and the cooling insert 80 (having the cross-wise extension 110) disposed in one of the sidewalls 52 of the housing 31. In the illustrated embodiments, the cross-wise extension 110 is configured (e.g., sized and shaped to fit under the electrochemical cells 30 to extract heat proximate a predetermined region (e.g., bottoms) of the electrochemical cells 30. The cross-wise extension 110, depending on the embodiment, may physically contact the respective bottoms of the electrochemical cells 30, may be separated from the bottoms of the electrochemical cells 30 via an electrically insulating (but thermally conductive) layer, or may be embedded within the housing 31. In the illustrated embodiments, the cross-wise extension 110 extends at an angle 111 (e.g., 90 degrees) from a main body 112 of the cooling insert 80. The main body 112 includes the two broad, continuously flat faces 82, as shown in FIGS. 11 and 12, though the main body 112 may, in other embodiments, include any of the surface features described herein. The cross-wise extension 110 may extract heat from the bottoms of the electrochemical cells 30 disposed in the housing 31 and direct the heat toward the two broad, continuously flat faces 82. Thus, fluid flowing through the cooling channels 50, in which at least a portion of main body 112 of the cooling insert 80 is disposed, may extract heat from the main body 112.

It should be noted that, as previously described, any of cooling inserts 80 may be configured to be disposed within the horizontal cavity 84 or may be over molded into the sidewall 52 of the housing 31, thus forming the horizontal cavity 84 of the sidewall 52. The cooling insert 80, along with the tapered cooling channels 50, may enhance thermal management of the battery module 13 by, for example, increasing the heat transfer surface area of the battery module 13, by increasing the velocity of fluid flow proximate the battery module 13 (e.g., through the cooling channels 50), and by reducing the distance through which heat generated by the electrochemical cells 30 must travel before being extracted from the battery module 13 (e.g., via fluid flowing through the cooling channels 50).

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
 a plurality of electrochemical cells arranged in a stack disposed within a housing wherein the housing comprises:
  a first sidewall and a second sidewall opposite the first sidewall, wherein the first and second sidewalls extend along the same direction as the stack such that each electrochemical cell of the plurality of electrochemical cells is disposed between the first sidewall and the second sidewall, wherein each of the first and second sidewalls comprises a first surface and a second surface opposite the first surface, and wherein each electrochemical cell of the plurality of electrochemical cells comprises a terminal end having at least one terminal, a base end opposite the terminal end, a first side extending between the terminal end and the base end, and a second side extending between the terminal end and the base end, wherein the first sidewall extends adjacent to and along the first side of each electrochemical cell of the plurality of electrochemical cells, and wherein the second sidewall extends adjacent to and along the second side of each electrochemical cell of the plurality of electrochemical cells; and
  a plurality of cooling channels extending through the corresponding first and second sidewalls of the housing from the respective first surface to the respective second surface, wherein the plurality of cooling channels is configured to permit fluid flow therethrough for cooling the plurality of electrochemical cells by heat transfer from the plurality of electrochemical cells, through at least a portion of the housing, and to the plurality of cooling channels, and wherein at least one cooling channel of the plurality of cooling channels comprises:
   a first cross-sectional area across the first surface of the corresponding first or second sidewall and a second cross-sectional area across the second surface of the corresponding first or second sidewall, wherein the first cross-sectional area and the second-cross sectional area are different; and
   a tapered portion extending between the first-cross sectional area and the second cross-sectional area.

2. The battery module of claim 1, wherein each cooling channel of the plurality of cooling channels comprises a common cross-sectional shape corresponding to the first and second cross-sectional areas.

3. The battery module of claim 1, wherein a first cooling channel of the plurality of cooling channels comprises a first cross-sectional shape corresponding to the first and second cross-sectional areas, a second cooling channel of the plurality of cooling channels comprises a second cross-sectional shape corresponding to the first and second cross-sectional areas, wherein the first cross-sectional shape is different than the second cross-sectional shape.

4. The battery module of claim 1, comprising a cooling insert disposed within a cavity of the housing, the cavity extending along and within the corresponding first or second sidewall between at least two cooling channels of the plurality of cooling channels.

5. The battery module of claim 4, wherein the cooling insert comprises a metal material configured to conduct heat away from the plurality of electrochemical cells.

6. The battery module of claim 4, wherein the cooling insert comprises two broad faces configured to extend within the corresponding first or second sidewall and between the at least two cooling channels of the plurality of cooling channels, wherein at least one of the two broad faces is disposed within the at least two cooling channels of the plurality of cooling channels.

7. The battery module of claim 6, wherein the two broad faces of the cooling insert are substantially flat.

8. The battery module of claim 6, wherein the cooling insert comprises a plurality of cooling fins disposed on at least one of the two broad faces, wherein at least one cooling fin of the plurality of cooling fins is configured to extend at least partially within a cooling channel of the plurality of cooling channels.

9. The battery module of claim 6, wherein the cooling insert comprises a plurality of insert channels disposed on the at least one of the two broad faces, wherein each of the plurality of insert channels is configured to be disposed into a corresponding cooling channel of the plurality of cooling channels.

10. The battery module of claim 6, wherein the cooling insert comprises a plurality of cooling fins disposed on at least one of the two broad faces, wherein each cooling fin of the plurality of cooling fins is configured to extend at least partially into the corresponding first or second sidewall of the housing.

11. The battery module of claim 4, wherein the cooling insert comprises a first portion and a second portion, wherein the first portion is disposed within the cavity of the housing and the second portion extends crosswise relative to the first portion and along a base surface of the housing.

12. The battery module of claim 4, wherein the housing is molded over the cooling insert.

13. The battery module of claim 1, comprising a fan configured to blow air through the plurality of cooling channels from the smaller of the first cross-sectional area or the second cross-sectional area toward the larger of the first cross-sectional area or the second cross-sectional area.

14. A housing for a battery module, comprising:
a first sidewall and a second sidewall disposed opposite the first sidewall; and
a first plurality of internal slots and a second plurality of internal slots disposed between the first and second sidewalls of the housing and defined by a plurality of partitions extending inwardly from the first and second sidewalls, respectively, wherein the first plurality of internal slots is configured to receive a first side of each electrochemical cell of a plurality of electrochemical cells, the second plurality of internal slots is configured to receive a second side of each electrochemical cell of the plurality of electrochemical cells, and the partitions of the plurality of partitions are spaced such that each internal slot of the first plurality and second plurality of internal slots is sized to accommodate one or more electrochemical cells of the plurality of electrochemical cells, wherein the first and second sidewalls of the housing each comprise:
a terminal surface configured to be disposed proximate terminals of the electrochemical cells, wherein the terminal surface has a planar orientation aligned with a direction in which the partitions extend inwardly;
a base surface aligned with and disposed opposite the terminal surface; and
a plurality of cooling channels extending through the first and second sidewalls from the terminal surface to the base surface, wherein the plurality of cooling channels are configured to permit fluid flow therethrough proximate sides of the plurality of electrochemical cells for cooling the plurality of electrochemical cells by heat transfer from the plurality of electrochemical cells, through at least the housing, and to the plurality of cooling channels, wherein each cooling channel of the plurality of cooling channels is tapered from the terminal surface to the base surface or from the base surface to the terminal surface.

15. The housing of claim 14, comprising:
a first cavity extending within the first sidewall and a second cavity extending within the second sidewall, wherein each of the first and second cavities extend through at least a portion of the plurality of cooling channels; and
a first cooling insert configured to be disposed within the first cavity and a second cooling insert configured to be disposed within the second cavity.

16. The housing of claim 15, wherein each of the first and second cooling inserts is configured to be inserted into the first and second cavities, respectively, or wherein the housing is molded over each of the first and second cooling inserts to form the first and second cavities, respectively.

17. The housing of claim 15, wherein the first cooling insert comprises a plurality of cooling fins, and each cooling fin of the plurality of cooling fins is configured to be at least partially disposed within a corresponding cooling channel of the plurality of cooling channels.

18. The housing of claim 15, wherein the first cooling insert comprises a first portion and a second portion, wherein the first portion is disposed within the first cavity of the housing and the second portion extends crosswise relative to the first portion and along a base housing surface.

19. The housing of claim 14, wherein each cooling channel of the plurality of cooling channels comprises substantially the same cross-sectional shape, wherein the cross-sectional shape is a triangle, a square, a rectangle, a circle, an ellipse, or an oval.

20. A housing for a battery module, comprising:
at least one sidewall configured to be disposed along sides of electrochemical cells received by the housing, wherein the at least one sidewall comprises:
a terminal surface configured to be disposed proximate terminals of the electrochemical cells;
a base surface disposed opposite the terminal surface;
a plurality of tapered cooling channels extending through the at least one sidewall from the terminal surface to the base surface; and
a cavity extending within the at least one sidewall and coupled to the plurality of tapered cooling channels; and
a cooling insert configured to be disposed within the cavity such that the cooling insert at least partially extends through the plurality of tapered cooling channels, wherein the cooling insert comprises a plurality of cooling tubes disposed through the cooling insert, and wherein each cooling tube of the plurality of cooling tubes is configured to be disposed in a corresponding tapered cooling channel of the plurality of tapered cooling channels.

21. The housing of claim 20, wherein the cooling insert comprises a plurality of cooling fins extending from a broad face of the cooling insert, wherein each cooling fin of the plurality of cooling fins is configured to at least partially extend into a corresponding tapered cooling channel of the plurality of tapered cooling channels.

22. The housing of claim 20, wherein each tapered cooling channel of the plurality of tapered cooling channels comprises a first cross-sectional area across the top surface of the at least one sidewall and a second cross-sectional area across the base surface of the at least one sidewall, wherein the first cross-sectional area is not equal to the second cross-sectional area.

23. The housing of claim 20, wherein each tapered cooling channel of the plurality of tapered cooling channels is tapered from the terminal surface of the at least one sidewall to the base surface of the at least one sidewall or from the base surface of the at least one sidewall to the terminal surface of the at least one sidewall, wherein each tapered cooling channel of the plurality of tapered cooling channels comprises a common cross-sectional shape at the terminal surface of the at least one sidewall, and wherein the common cross-sectional shape is a triangle, a square, a rectangle, a circle, an ellipse, or an oval.

24. The battery module of claim 1, wherein the battery module is a lithium ion battery.

25. The housing of claim 20, wherein the housing is at least partially a polymer material.

* * * * *

UNITED STATES PATENT AND TRADEMARK OFFICE
CERTIFICATE OF CORRECTION

PATENT NO. : 10,062,934 B2
APPLICATION NO. : 14/340352
DATED : August 28, 2018
INVENTOR(S) : Kem M. Obasih et al.

Page 1 of 1

It is certified that error appears in the above-identified patent and that said Letters Patent is hereby corrected as shown below:

On the Title Page

In Item (57), under "ABSTRACT," in Column 2, Line 13, please delete "second-cross sectional" and insert -- second cross-sectional --.

In Item (57), under "ABSTRACT," in Column 2, Line 15, please delete "first-cross sectional" and insert -- first cross-sectional --.

In the Specification

In Column 2, Line 52, please delete "second-cross sectional" and insert -- second cross-sectional --.

In Column 2, Line 54, please delete "first-cross sectional" and insert -- first cross-sectional --.

In Column 3, Line 27, please delete "DRAWINGS" and insert -- BRIEF DESCRIPTION OF DRAWINGS --.

In Column 8, Line 22, please delete "second-cross sectional" and insert -- second cross-sectional --.

In Column 11, Line 41, please delete "cooling channels 100" and insert -- cooling channels 50 --.

In Column 12, Line 47, please delete "(e.g.," and insert -- e.g., --.

In the Claims

In Column 14, Lines 17-19, in Claim 1, please delete "second-cross sectional" and insert -- second cross-sectional --.

In Column 14, Lines 19-20, in Claim 1, please delete "first-cross sectional" and insert -- first cross-sectional --.

Signed and Sealed this
Twenty-fifth Day of December, 2018

Andrei Iancu
*Director of the United States Patent and Trademark Office*